US007957373B2

(12) United States Patent
Ku et al.

(10) Patent No.: US 7,957,373 B2
(45) Date of Patent: *Jun. 7, 2011

(54) METHOD AND SYSTEM TO PROVIDE CONTACT SERVICES IN A COMMUNICATION NETWORK

(75) Inventors: Bernard Ku, Austin, TX (US); Mehrad Yasrebi, Austin, TX (US); Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/954,911

(22) Filed: Dec. 12, 2007

(65) Prior Publication Data
US 2009/0154452 A1 Jun. 18, 2009

(51) Int. Cl.
H04L 12/28 (2006.01)
(52) U.S. Cl. ......... 370/389; 370/230; 370/352; 709/219
(58) Field of Classification Search .................. 370/230, 370/352; 707/100
See application file for complete search history.

(56) References Cited

U.S. PATENT DOCUMENTS

| 3,428,750 | A | 2/1969 | Hoffman |
| 3,478,174 | A | 11/1969 | MacLeod et al. |
| 3,787,632 | A | 1/1974 | Male et al. |
| 6,161,008 | A | 12/2000 | Lee |
| 6,694,004 | B1 | 2/2004 | Knoerle |
| 6,697,478 | B1 | 2/2004 | Meldrum |
| 6,816,582 | B2 | 11/2004 | Levine |
| 6,978,003 | B1 | 12/2005 | Sylvain |
| 2003/0097485 | A1 | 5/2003 | Horvitz |
| 2003/0128693 | A1 | 7/2003 | Segal |
| 2003/0131069 | A1 | 7/2003 | Lucovsky |
| 2003/0131142 | A1 | 7/2003 | Horvitz |
| 2004/0003114 | A1 | 1/2004 | Adamczyk |
| 2004/0047341 | A1 | 3/2004 | Staack |
| 2005/0195802 | A1 | 9/2005 | Klein |
| 2005/0195954 | A1 | 9/2005 | Klein |
| 2005/0201362 | A1 | 9/2005 | Klein |
| 2005/0207402 | A1 * | 9/2005 | Kobayashi et al. ........... 370/352 |
| 2006/0036642 | A1 | 2/2006 | Horvitz |
| 2006/0072726 | A1 | 4/2006 | Klein |
| 2006/0077965 | A1 * | 4/2006 | Garcia-Martin et al. ..... 370/352 |
| 2006/0120362 | A1 | 6/2006 | Westman et al. |
| 2006/0167977 | A1 | 7/2006 | Wu |
| 2006/0195460 | A1 * | 8/2006 | Nori et al. ..................... 707/100 |
| 2006/0209690 | A1 | 9/2006 | Brooke |
| 2007/0019623 | A1 | 1/2007 | Alt |
| 2007/0043829 | A1 | 2/2007 | Dua |

(Continued)

OTHER PUBLICATIONS

Mealling, M. and Daniel, R. "The Naming Authority Pointer (NAPTR) DNS Resource Record", Request for Comments: 2915, Sep. 2000, 17 pp.

(Continued)

*Primary Examiner* — Robert W Wilson
*Assistant Examiner* — Mohamed Kamara
(74) *Attorney, Agent, or Firm* — Toler Law Group

(57) ABSTRACT

A communication system includes an application server including logic to receive preference data for each of a plurality of data record entries of a subscriber record from a telephone number mapping (ENUM) server, and to determine a contact sequence including a plurality of Uniform Resource Identifiers (URIs). The contact sequence is based at least in part on the received preference data.

22 Claims, 9 Drawing Sheets

U.S. PATENT DOCUMENTS

| | | |
|---|---|---|
| 2007/0106612 A1 | 5/2007 | O'Brien |
| 2007/0116250 A1 | 5/2007 | Stafford |
| 2007/0129108 A1 | 6/2007 | Swanburg |
| 2008/0146201 A1 | 6/2008 | O'Neill et al. |
| 2008/0317000 A1 | 12/2008 | Jackson |
| 2009/0040923 A1* | 2/2009 | Bantukul et al. .............. 370/230 |
| 2009/0116623 A1 | 5/2009 | Ku et al. |
| 2009/0154451 A1 | 6/2009 | Ku et al. |

OTHER PUBLICATIONS

Faltstrom, P. "The E.164 to Uniform Resource Identifiers (URI) Dynamic Delegation Discovery System (DDDS) Application (ENUM)", Request for Comments: 3761, Apr. 2004, 17 pp.

Faltstrom, P. "E.164 Number and DNS", Request for Comments: 2916, Sep. 2000, 10 pp.

* cited by examiner

METHOD AND SYSTEM TO PROVIDE CONTACT SERVICES IN A COMMUNICATION NETWORK

FIELD OF THE DISCLOSURE

The present disclosure is generally related to a method and system to provision and provide contact services.

BACKGROUND

Provisioning and providing contact services in a communication network typically involves multiple work flows and steps, and often involves a large coordination effort. It can be a tedious, time consuming and error prone process that may involve changes to several systems, such as central data storage, Private Branch Exchange (PBX) systems, Advanced Intelligent Network (AIN) triggers, Central Office switch logic, and Signaling System Seven (SS7) internetworking systems. Hence, there is a need for an improved method and system to provision and provide contact services in a communication network.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings may indicate similar or identical items.

DETAILED DESCRIPTION

Figure 1:
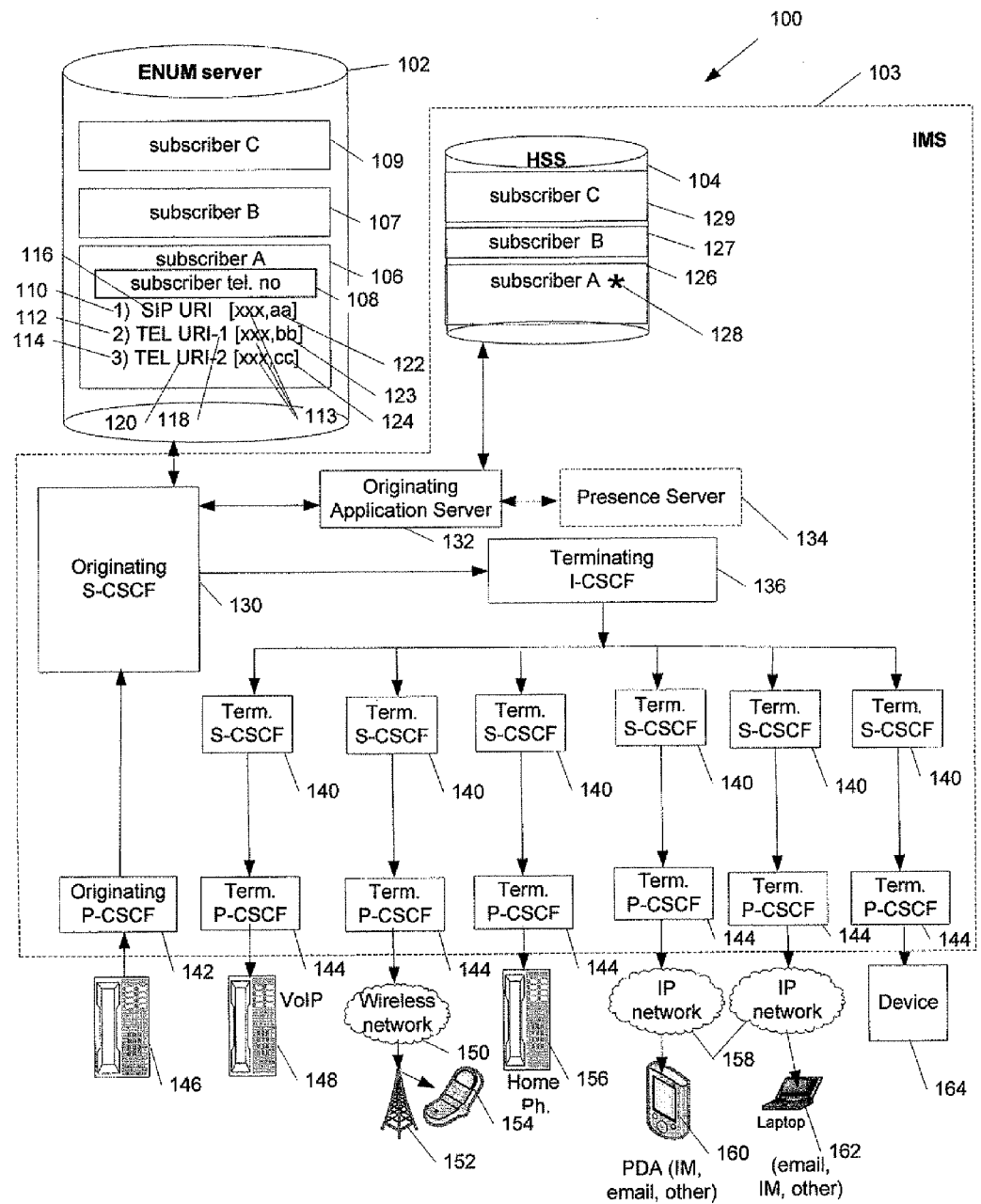
FIG. 1 is a diagram of a particular illustrative embodiment of a system to provide contact services in a communication network.

The disclosure is generally directed to a system and method to provision and provide contact services in a communication network. In a particular embodiment, the system includes an Internet Protocol Multimedia Subsystem (IMS) including a Home Subscriber Server (HSS), and a telephone number mapping (ENUM) server. The ENUM server includes a plurality of records, and typically includes one subscriber record for each subscriber to a contact service. A subscriber record may be associated with a subscriber telephone number. The subscriber record can include data record entries, with each data record entry including a Uniform Resource Indicator (URI), a corresponding order data value (also order value herein) and a corresponding preference data value (also preference value herein). During operation, the IMS may receive a call placed to the subscriber telephone number from an originating device. In a particular illustrative embodiment, an application server may verify that the order data values associated with the URIs in the associated subscriber record have a common value, and that the preference data values associated with the URIs in the associated subscriber record differ from one another. The IMS may receive the URIs from the subscriber record after verification that a registration status of the subscriber is active. The IMS may provide a contact sequence in which to contact destination devices identified by the URIs, based upon the associated preference data values. The IMS may proceed to sequentially contact the destination devices identified by the URIs according to the contact sequence. The IMS may set up an end-to-end communication path between the originating device and the first destination device to respond, and the IMS may also cancel INVITE messages to the other destination devices. In another particular illustrative embodiment, the application server may verify that the order data values associated with the URIs in the associated subscriber record differ from one another, and that the preference data values associated with the URIs in the associated subscriber record have a common value. The IMS may receive the URIs from the subscriber record after verification that a registration status of the subscriber is active. The IMS may provide a contact sequence in which to contact destination devices identified by the URIs, based upon the associated order data values. In yet another embodiment, neither any of the order values nor any of the preference values may be common among the URIs. The IMS may provide a contact sequence in which it considers a combination of each pair of order and preference values of each URI record in comparison against pairs of order and preference values of other URIs. The IMS may proceed to sequentially contact the destination devices identified by the URIs according to the contact sequence. The IMS may set up an end-to-end communication path between the originating device and the first destination device to respond, and the IMS may also cancel INVITE messages to the other destination devices.

In a particular embodiment, the system includes an application server including logic to receive preference data for each of a plurality of data record entries of a subscriber record from a telephone number mapping (ENUM) server and to determine a contact sequence including a plurality of Uniform Resource Identifiers (URIs). The contact sequence is based at least in part on the received preference data.

In another embodiment, a method includes receiving from a telephone number mapping (ENUM) server a plurality of Uniform Resource Identifiers (URIs), where each of the plurality of URIs has a common order data value and each of the plurality of URIs has a distinct preference data value. The method also includes sequentially initiating invite messages via an Internet Protocol Multimedia Subsystem (IMS) to destination devices identified by each of the plurality of URIs according to a sequence order.

In another embodiment, a method of registering a plurality of devices of a subscriber includes receiving a plurality of Uniform Resource Indicators (URIs) that identify a corresponding plurality of devices to be registered, and establishing a contact sequence that identifies an order in which to contact each of the plurality of devices identified by the plurality of URIs. The method also includes assigning to each URI a common order data value and a unique preference data value, or a unique order and a unique preference value for each URI, where each of the corresponding preference data values are associated with the contact sequence. The method further includes forming a data record entry for each URI, each data record entry including the order data value and the corresponding preference data value, and storing the data record entries in a telephone number mapping (ENUM) server.

In another embodiment, a computer readable medium is disclosed and includes computer executable instructions to cause a processor to receive a contact request via a subscriber telephone number associated with a subscriber and to initiate invite messages sequentially via an Internet Protocol Multimedia Subsystem (IMS) to each of a plurality of devices associated with the subscriber in response to the contact request. Each of the plurality of devices is identified by a corresponding Uniform Resource Indicator (URI) stored in a telephone number mapping (ENUM) server, and each URI has a unique preference data value associated with it. The invite messages are initiated according to a sequence based on the preference data values.

FIG. 1 is a block diagram of a particular embodiment of a system 100 to provide contact services in a communication network. The system 100 includes a Telephone Number Mapping (ENUM) server 102 communicating with an IP Multimedia Subsystem (IMS) 103. The system 100 may include an Originating Device 146 (also originating station herein) and one or more destination devices 148, 154, 156, 160, 162, and 164. Device 164 may be a public switched telephone network (PSTN) device, a public land mobile network (PLMN) device, or another device.

In a particular embodiment, the IMS 103 includes a Home Subscriber Server (HSS) 104, an Originating Proxy-Call Session Control Function (P-CSCF) 142, an Originating Serving-Call Session Control Function (S-CSCF) 130, an Originating Application Server 132, a Terminating Interrogating-Call Session Control Function (I-CSCF) 136, and one or more Terminating S-CSCFs 140 and one or more Terminating P-CSCFs 144. Optionally, the IMS 103 may also include additional Originating P-CSCFs, additional Originating S-CSCFs, and additional Originating Application Servers (not shown). Optionally, the IMS 103 may also include a Presence Server 136 communicatively coupled to the Originating Application Server 132. Each of the Terminating S-CSCFs 140 is coupled to the corresponding Terminating P-CSCF 144. Each of the Terminating P-CSCFs 144 may communicate with a corresponding destination device, such as a Voice over Internet Protocol (VoIP) device 148.

In a particular embodiment, the Originating Device 146 may originate a contact request by placing a call via the Originating P-CSCF 142. The call may be directed to a subscriber telephone number. In a particular illustrative embodiment, the subscriber telephone number may be an E.164 telephone number. The Originating P-CSCF 142 may communicate the contact request to the Originating S-CSCF 130. The Originating S-CSCF 130, in response to the contact request, can inquire to the ENUM server 102 about an address, e.g., a Uniform Resource Identifier (URI) associated with a destination device to be called. In the following illustrative sample scenario, Originating Device 146 is being used to contact subscriber A.

The IMS 103 may verify, via the HSS 104, that subscriber A is actively registered for a contact service. The HSS 104 may include a first subscription accounting record 126 corresponding to subscriber A. The first subscription accounting record 126 may include an indicator 128 indicating that subscriber A is an active subscriber to the contact service. The HSS 104 may also include subscription accounting records associated with other subscribers, such as a second subscription accounting record 127 associated with a subscriber B and a third subscription accounting record 129 associated with a subscriber C.

The Originating S-CSCF 130 can communicate with the ENUM server 102 in response to the contact request. The ENUM server 102 may locate the subscriber telephone number stored in a subscriber record and may retrieve one or more Uniform Resource Indicators (URIs) that correspond to the called subscriber telephone number. For example, a subscriber A that subscribes to a contact service may have a subscriber record 106 stored within the ENUM server 102 in which a subscriber telephone number 108 has been stored. The subscriber record 106 may include one or more data record entries, such as data record entries 110, 112, and 114. URIs 116, 118, 120 may be stored in the subscriber record 106 and each URI may correspond to a particular destination device, such as one of the destination devices 148, 154, 156, 160, 162, or 164. Each additional subscriber to the system may have a subscriber record stored in the ENUM server 102. For example, subscriber record 107 may be associated with subscriber B and subscriber record 109 may be associated with subscriber C.

The Originating Application Server 132 or the Originating S-CSCF 130 may determine that each of the data record entries 110, 112, 114 includes a common order data value 113 (order value and order data value are used interchangeably herein), and that each of the data record entries 110, 112, and 114 includes a corresponding unique preference data value 122, 123, and 124 preference value and preference data value are used interchangeably herein). The Originating Application Server 132 may determine a contact sequence in which to contact destination devices identified by URIs 116, 118, and 120. The contact sequence may be based on the corresponding preference data values 122, 123, and 124. (In another particular illustrative embodiment not shown, the Originating Application Server may determine that each of the data record entries includes a unique corresponding order data value and that each of the data record entries includes a unique corresponding preference data value. The Originating Application Server may determine a contact sequence in which to contact destination devices identified by URIs. The contact sequence may be based on the corresponding order data values and the corresponding preference data values. In another particular illustrative embodiment not shown, the Originating Application Server may determine that each of the data record entries includes a unique corresponding order data value and that each of the data record entries includes a common preference data value. The Originating Application Server may determine a contact sequence in which to contact destination devices identified by URIs. The contact sequence may be based on the corresponding order data values.)

In a particular illustrative embodiment, the Originating Application Server 132 may query the Presence Server 134 to determine if any of the destination devices identified by the URIs 116, 118, and 120 are unavailable to be contacted. The Originating Application Server 132 may remove from the contact sequence (by, e.g., removing the corresponding URI from the contact sequence) any destination device that the Presence Server 134 determines to be unavailable.

The Originating S-CSCF 130 may receive the contact sequence and may also receive URIs 116, 118, and 120. The Originating S-CSCF 130 may issue INVITE messages sequentially to each destination device identified by the corresponding URI.

The Originating S-CSCF 130 may send the INVITE messages, such as one or more Session Initiation Protocol (SIP) INVITE messages, sequentially to the Terminating I-CSCF 136. In a particular illustrative embodiment, the Originating Application Server 132 may provide a communication, such as a pre-recorded message, to be delivered to one of the destination devices being contacted.

For each INVITE message issued, the Terminating I-CSCF 136 may contact one of the Terminating S-CSCFs 140. The contacted Terminating S-CSCF 140 may contact a corresponding Terminating P-CSCF 144, which may contact an associated destination device, such as VoIP device 148, cellular telephone device 154, home telephone 156, Personal Digital Assistant (PDA) 160, computer 162, or device 164. For example, one of the Terminating P-CSCFs 144 may contact the cellular telephone 154 via a wireless network 150 and a cellular tower 152. In another example, one of the Terminating P-CSCFs 144 may contact the PDA 160 via an Internet Protocol (IP) network 158. In yet another example, one of the Terminating P-CSCFs 144 may contact the computer 162 via the IP network 158. When contact is established with a particular device, attempts to contact other devices may cease, which may be accomplished by the Originating S-CSCF 130 canceling INVITE messages to the other destination devices. An end-to-end communication path may be established between the Originating Device 146 and the first destination device with which contact is established. Communication may ensue via, e.g., voice, email, instant messaging (IM), or via another communication mode.

Figure 2:
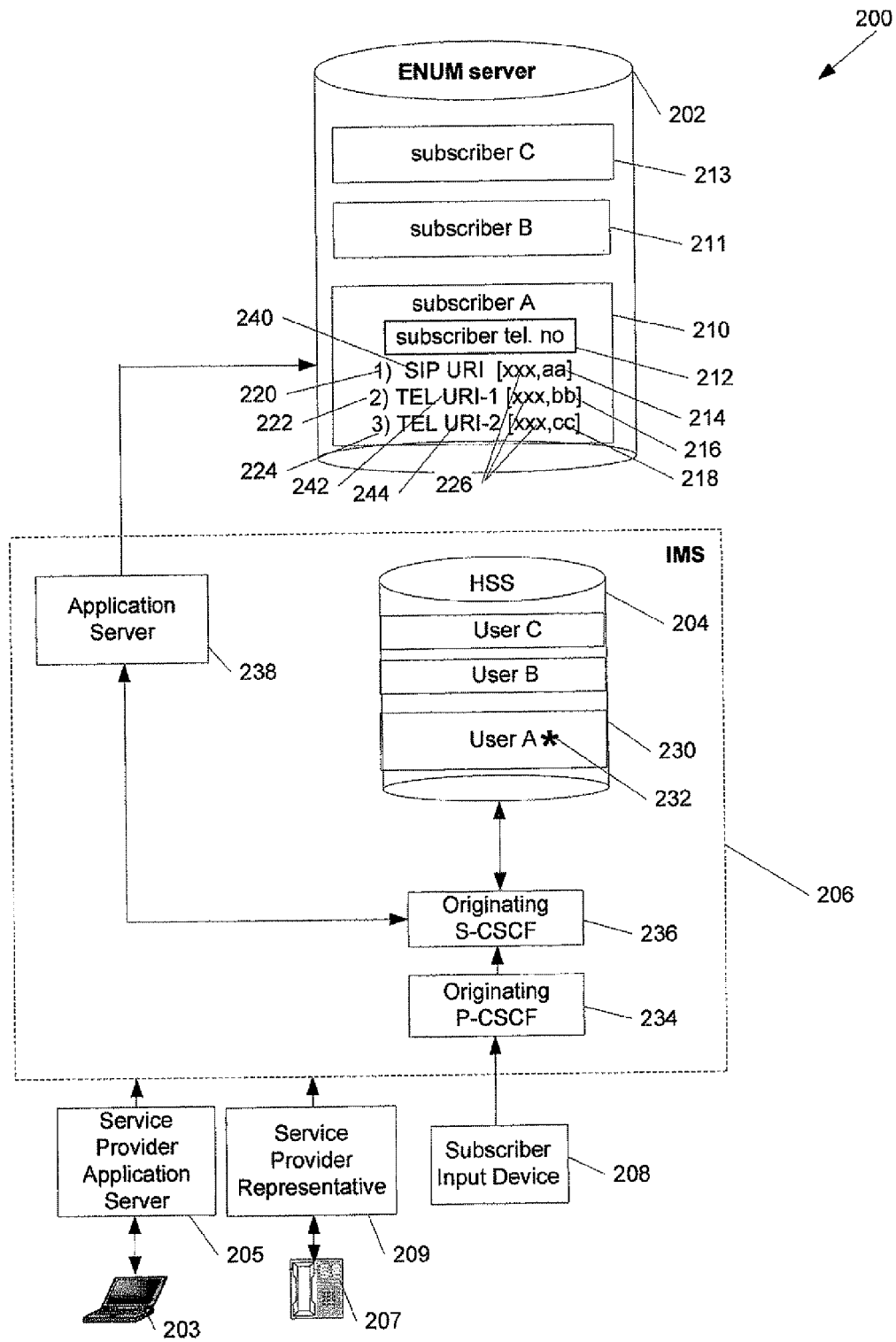
FIG. 2 is a diagram of a particular illustrative embodiment of a system to provision contact services in a communication network.

FIG. 2 is a diagram of a particular illustrative embodiment of a system to provision contact services in a communication network. Provisioning may include configuring data within a system, such as a Telephone Number Mapping (ENUM) server. A communication system 200 includes a Telephone Number Mapping (ENUM) server 202 coupled with an Internet Protocol Multimedia Subsystem (IMS) 206. The IMS 206 may include an Originating Proxy-Call Session Control Function (P-CSCF) 234 communicatively coupled to an Originating Serving-Call Session Control Function (S-CSCF) 236 that is communicatively coupled to a Home Subscriber Server (HSS) 204 and also communicatively coupled to an Application Server 238. The IMS 206 may also include other components (not shown). The communication system 200 may also include a Subscriber Input Device 208. The communication system 200 may also include a Service Provider Representative 209. The communication system 200 may also include a Service Provider Application Server 205.

In a particular illustrative embodiment, a Subscriber Input Device 208, such as a Voice-over Internet Protocol (VoIP) device, may provide input via an Originating Proxy-Call Session Control Function (P-CSCF) 234 within the IMS 206. In another particular illustrative embodiment, a computer 203 or other device such as a Personal Digital Assistant (PDA) (not shown) may provide input via the Service Provider Application Server 205 that may act as an interactive application or another information input system to convey data to the IMS 206. In yet another particular illustrative embodiment, a Subscriber Telephone 207 may provide input via the Service Provider Representative 209, which may include a human representative, an automated telephone information input system, or another information input mechanism.

In operation, a subscriber A may set up a subscriber record within the ENUM server 202 by various means, such as via a service provider application (not shown). The HSS 204 may include a subscription accounting record for each subscriber, such as a subscription accounting record 230 associated with subscriber A. The subscription accounting record 230 can include an indicator 232 indicating that subscriber A has a subscription to a contact service with an active subscription status.

Contact data related to the subscriber A may be provided to the IMS 206 to be stored in the ENUM server 202. In an illustrative embodiment, subscriber A may provide or modify the contact data. The contact data or modified contact data may be supplied to the Application Server 238 in the IMS 206 via, e.g., the Service Provider Application Server 205. For instance, subscriber A may provide contact data including a subscriber telephone number to be called as a contact request and a plurality of Uniform Resource Identifiers (URIs). When the subscriber telephone number is called, contacting of destination devices is initiated, with each URI identifying a corresponding destination device. The contact data may also include a common order data value and a unique preference data value for each of the URIs. The Subscriber Input Device 208 may transmit the contact data to the Originating P-CSCF 234. In another particular illustrative embodiment not shown, the contact data may include a unique order data value for each of the URIs and a common preference data value. In yet another particular illustrative embodiment not shown, the contact data may include a unique order data value and a unique preference data value for each of the URIs.

The contact data may be transmitted to the Application Server 238. In a particular illustrative embodiment, the IMS 206 may verify that the subscriber A is actively registered for the contact service by requesting and receiving verification of active subscription status from the HSS 204 prior to receiving the contact data, or prior to transmitting the contact data to the ENUM server 202.

The Application Server 238 may provide the contact data associated with subscriber A to the ENUM server 202. The ENUM server 202 may place each URI in a data record entry along with unique pairs of order data values and preference data values, and each data record entry may be stored in a subscriber record associated with subscriber A, such as a first subscriber record 210. The first subscriber record 210 may also include a subscriber telephone number 212, which may be received from the Application Server 238 as part of the contact data supplied by the Subscriber Input Device 208. For example, the first subscriber record 210 may include a first data record entry 220 that includes a first URI 240, a common order data value 226 and a first preference data value 214; a second data record entry 222 that includes a second URI 242, the common order data value 226 and a second preference data value 216; a third data record entry 224 that includes a third URI 244, the common order data value 226 and a third preference data value 218; and the subscriber telephone number 212. In another illustrative embodiment, each data record entry may include a URI with a unique order data value and a common preference data value. In yet another illustrative embodiment not shown, the contact data may include a unique order data value and a unique preference data value for each of the URIs. Each other subscriber of the system may also have a corresponding subscriber record stored in the ENUM server 202. For example, a subscriber B may have a second subscriber record 211 and subscriber C may have a third subscriber record 213.

Figure 3:
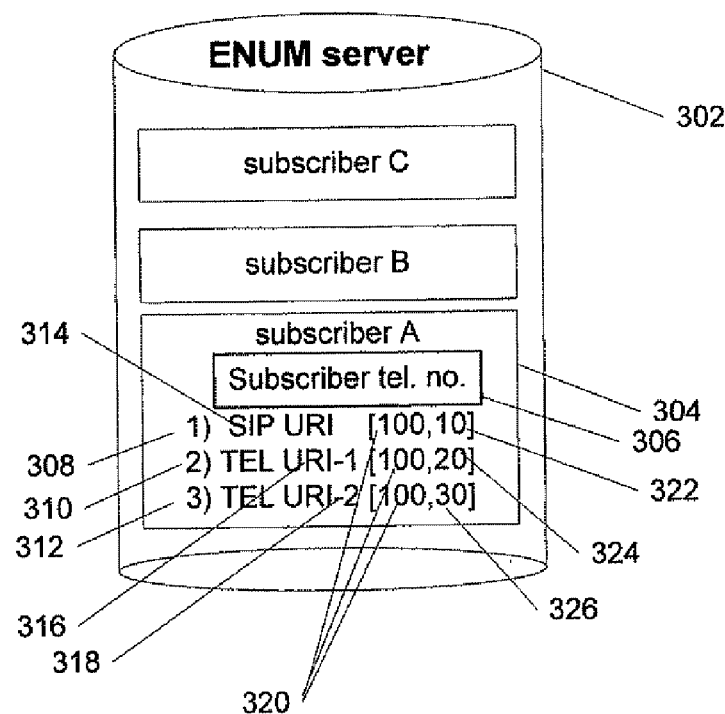
FIG. 3 is a diagram of a particular illustrative embodiment of a portion of a system to provision contact services in a communication network.

FIG. 3 is a diagram of a particular illustrative embodiment of a first portion of a system to provision contact services in a communication network. An ENUM server 302 includes a subscriber record 304 associated with a subscriber A. The subscriber record 304 may include a subscriber telephone number 306 and plurality of data record entries 308, 310, and 312, each data record entry including a URI associated with a corresponding destination device, a common order data value and a corresponding preference data value. For example, a URI 314 can be a SIP URI for SIP devices, and URIs 316 and 318 can be URIs for corresponding Public Service Telephone Network (PSTN) telephone devices. (While the illustration provide herein uses SIP and PSTN devices as examples, other devices may be used that support other protocols available presently or in the future). The data record entries 308, 310 and 312 that store corresponding URIs 314, 316, and 318 each have a common order data 320 having a data value of 100, and corresponding preference data 322, 324, and 326 with corresponding data values 10, 20, and 30. In an illustrative embodiment, the order data and preference data may have been supplied by the subscriber A. In an illustrative, non-limiting embodiment, the order data and preference data may have been assigned based on instructions provided by the subscriber A, or by an application server adapted to communicate with the ENUM server 302, or may have been assigned by the ENUM server 302 based on instructions provided by the subscriber A. When a call is placed to a subscriber telephone number 306, INVITE messages can be issued to each of the URIs in the subscriber record 304 according to a contact sequence based at least in part on the preference data values 322, 324, and 326. In another illustrative embodiment not shown, in which URIs have a common preference data value and unique order data values, the contact sequence may be based at least in part on the order data values. In yet another illustrative embodiment not shown, in which URIs have a unique pairs of preference data values and unique order data values, the contact sequence may be based at least in part on the pairs of order data values and preference data values of each URI.

In an illustrative example, the INVITE messages may be issued according to a contact sequence that includes a temporal schedule based on a numerical difference between two successive preference data values. For instance, considering data record entries 308, 310, and 312, the numerical difference between two successive preference data values is 10 (preference data 326–preference data 324=10; preference data 324–preference data 322=10). The INVITE messages may be initiated according to a temporal schedule specifying initiating INVITE messages separated by a specified time interval, e.g., a 10 second interval, based upon a numerical difference in preference data values of successive data record entries. In another illustrative embodiment not shown, in which URIs have a common preference data value and unique order data values, the INVITE messages may be issued according to a contact sequence that includes a temporal schedule based on a numerical difference between two successive order data values. In another illustrative embodiment not shown, in which URIs have unique preference data value and order data value pairs, the INVITE messages may be issued according to a contact sequence that includes a temporal schedule based on numerical values of the order data and the preference data, such as numerical differences between successive order data values and numerical differences between the corresponding preference values.

In another illustrative example, an Originating Application Server may provide a temporal schedule that is based on the preference data values of corresponding URIs. Alternatively, the subscriber A may supply a sequential order in which to contact destination devices. A temporal ordering scheme may be provided by, e.g., subscriber A, that may be based on the preference data values associated with the corresponding URIs. The Originating Application Server (not shown) within an Internet Protocol Multimedia Subsystem (IMS) may determine a temporal schedule in which to initiate the INVITE messages based on the preference data values and the temporal ordering scheme provided by the subscriber A. (In another illustrative embodiment not shown, in which URIs have a common preference data value and unique order data values, an Originating Application Server may provide a temporal schedule that is based on the order data values of corresponding URIs.) In another illustrative embodiment not shown, in which URIs have unique order data value and preference data value pairs, an Originating Application Server may provide a temporal schedule based on a numerical difference between two successive order data values and a numerical difference between two corresponding successive preference values of two URIs.

Figure 4:
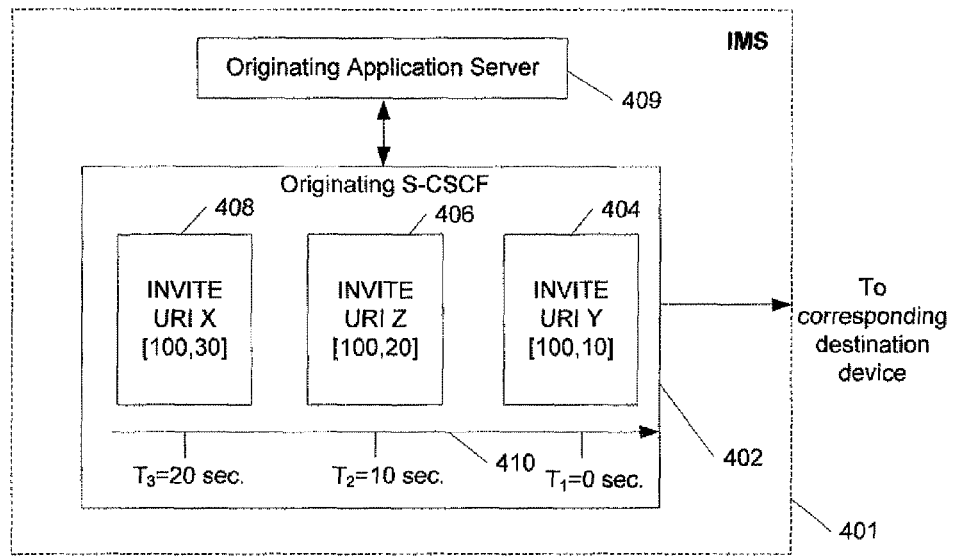
FIG. 4A is a diagram of a first particular illustrative embodiment of a portion of a system to provide contact services in a communication network.
FIG. 4B is a diagram of a second particular illustrative embodiment of a portion of a system to provide contact services in a communication network.
Figure 4:
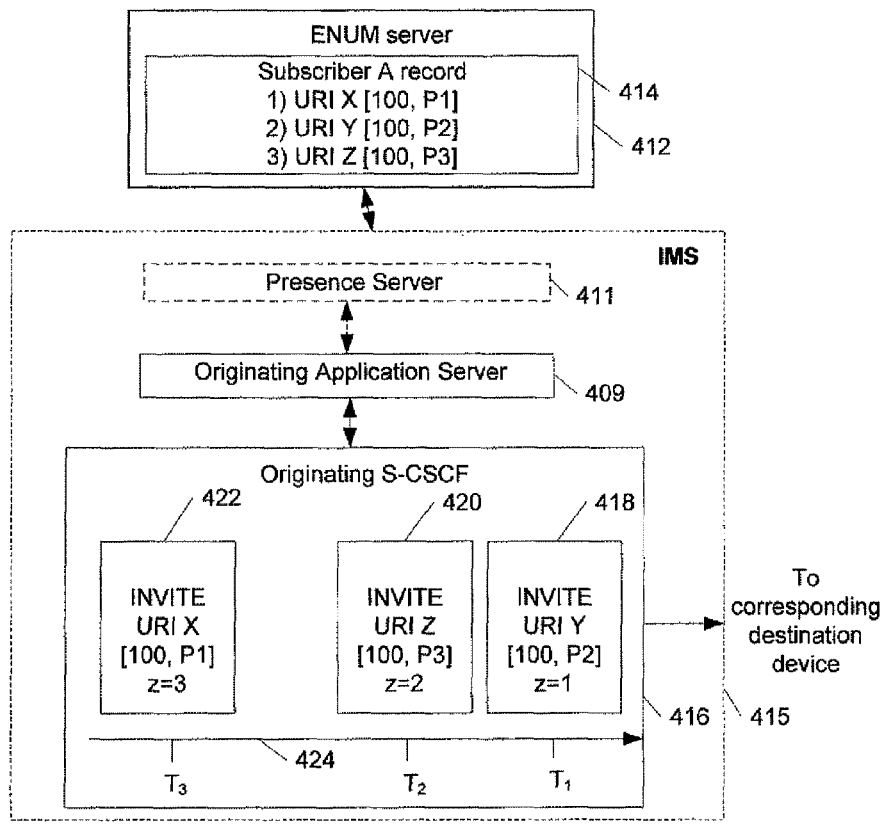

FIG. 4A is a diagram of a first particular illustrative embodiment of a portion of a system to provide contact services in a communication network. An Internet Protocol Multimedia Subsystem (IMS) 401 includes an Originating Serving-Call Session Control Function (S-CSCF) 402 and an Originating Application Server 409. During operation, the IMS 401 receives a call to a subscriber telephone number, such as an E.164 number, of a subscriber that has an active subscription to a contact service. In a particular illustrative example, the call may be placed using a SIP INVITE message received by the IMS 401. The Originating Application Server 409 can respond to the call by specifying a contact sequence, including a temporal schedule based on preference data values corresponding to URIs associated with the subscriber that have been retrieved from a Telephone Mapping (ENUM) server (not shown), where each URI has a common order data value (e.g. order data value=100). In another illustrative embodiment in which URIs have a common preference data value and unique order data values, the contact sequence may include a temporal schedule based on order data values corresponding to URIs associated with the subscriber that have been retrieved from a Telephone Mapping (ENUM) server (not shown). In yet another illustrative embodiment in which URIs have different order data values and different preference data values, the contact sequence may include a temporal schedule that is derived from the differences between order data values and differences between preference data values associated with the corresponding URIs associated with the subscriber that have been retrieved from a Telephone Mapping (ENUM) server (not shown).

The contact sequence may be used to initiate INVITE messages to each of the URIs. In the particular illustrative embodiment shown in FIG. 4A, the temporal schedule is based on differences in successive preference data values of URIs. The Originating Application Server 409 can provide the contact sequence, which is shown in FIG. 4A to be URI Y, URI Z, URI X, to the Originating S-CSCF 402. In the example shown, URI Y has a preference data value of 10; URI Z has a preference data value of 20; and URI X has a preference data value of 30. The temporal schedule may be based on the associated preference data values of the URIs. As shown on a timeline 410, an INVITE message 404 to URI Y may be issued at a time of $T_1$=0 seconds; an INVITE message 406 to URI Z may be issued at $T_2$=10 seconds; and an INVITE message 408 to URI X may be issued at $T_3$=20 seconds.

FIG. 4B is a diagram of a second particular illustrative embodiment of a portion of a system to provision contact services in a communication network. An Internet Protocol Multimedia Subsystem (IMS) 415 includes an Originating Serving-Call Session Control Function (S-CSCF) 416 communicatively coupled to an Originating Application Server 409. Optionally, the IMS 415 also includes a Presence Server 411 communicatively coupled to the Originating Application Server 409. The Presence Server 411 may confirm an availability of each destination device to be contacted, or may indicate that one or more of the destination devices associated with corresponding URIs are unavailable to be contacted. If one or more destination devices are unavailable, INVITE messages will not be issued to those destination devices that are unavailable. An ENUM server 412 can supply data record entries (in the example shown, a total of N=3 data record entries are supplied) that are stored in a subscriber record 414 associated with a subscriber A. Each data record entry has a URI with a common order data value and preference data with a unique preference data value $P_i$ (i=1 to N). The Originating Application Server 409 in the IMS 415 sequences the N data record entries according to preference data value, forming a contact sequence of data record entries with data fields [100, $P_z$] (z=1 to N, where z is an index that corresponds to a position in the sequence), in which a smaller value of z corresponds to a more preferential contact with which contact will be attempted earlier in the sequence. In the example shown, the data record entry (z=1) containing URI Y has a first preference data value P2. Similarly, the data record entry (z=2) containing URI Z has a second preference data value P3, and the data record entry (z=3) containing URI X has a third preference data value P1. In the illustrative embodiment shown, the Originating S-CSCF 416 of the IMS 415 sends INVITE messages 418, 420, and 422 to destination devices corresponding to the URIs, according to a temporal schedule that is based on the corresponding preference data values P2 (z=1), P3 (z=2), and P1 (z=3). (In another particular illustrative embodiment not shown, in which URIs have a common associated preference data value and each URI has a unique associated order data value, the temporal schedule may be based on the corresponding order data values of the associated URIs. In another particular illustrative embodiment not shown, in which URIs have different order data values and different preference data values, a temporal schedule may be based on any algorithm that considers the order data values and preference data values of the associated URIs.) A time of issuance $T_1$, $T_2$, $T_3$, of each of the corresponding INVITE messages 418, 420, and 422, as shown on a timeline 424, can be specified by, e.g. the Originating Application Server 409, according to a temporal schedule that may be generated by the Originating Application Server 409, which temporal schedule may be based on input from the subscriber A. The temporal schedule may specify, e.g., a time to initiate each INVITE message, or a time difference between successive INVITE messages. The time between initiating successive INVITE messages may be an approximately equal time period between each two successive INVITE messages, or may differ from one pair of successive INVITE messages to another pair of successive INVITE messages. In the illustrative embodiment shown, a first time period $\Delta T_1 = (T_1 - T_2)$ may differ from a second time period $\Delta T_2 = (T_2 - T_3)$. (In a particular illustrative embodiment, if the Presence Server 411 indicates that certain destination devices are unavailable, then INVITE messages will not be issued to the URIs corresponding to the unavailable destination devices.)

Figure 5:
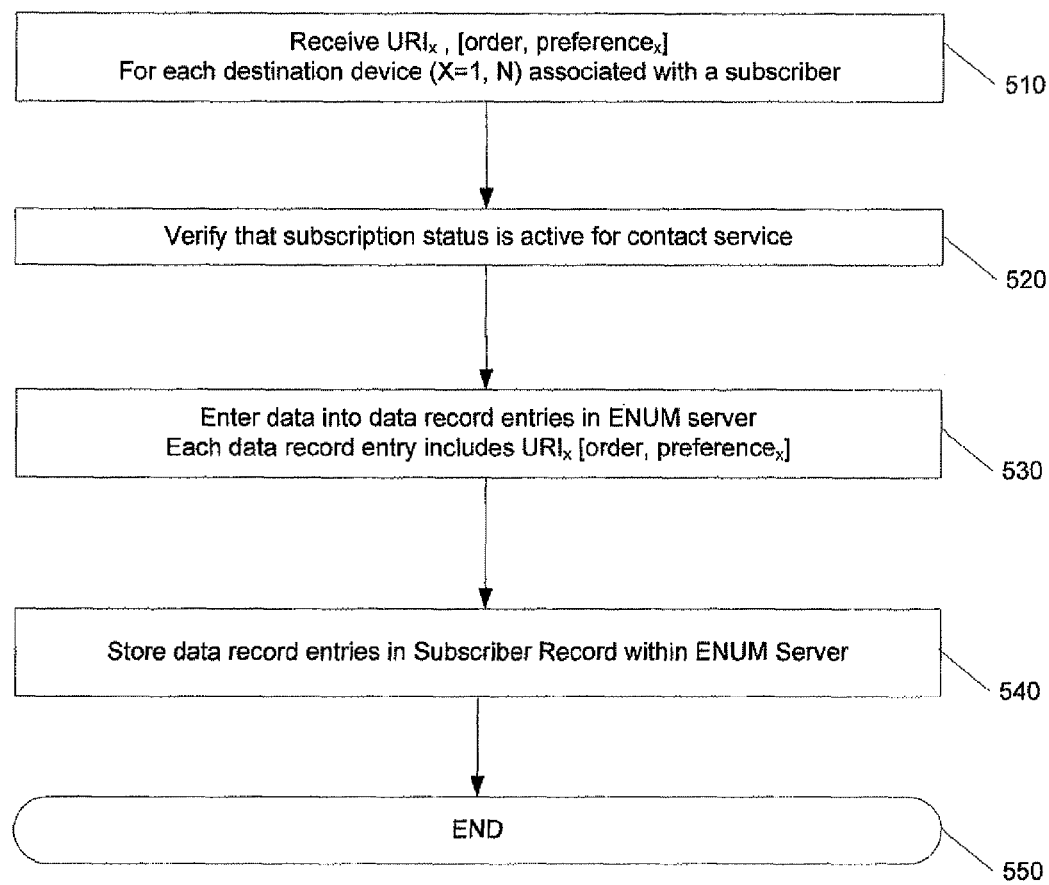
FIG. 5 is a flow chart of a particular illustrative embodiment of a method of storing contact information into a telephone number mapping (ENUM) server in a communication network.

FIG. 5 is a flow diagram according to a particular illustrative embodiment of a method of storing contact information into a telephone number mapping (ENUM) server in a communication network. At block 510, a plurality of URIs are received, each URI identifying a corresponding destination contact device associated with a subscriber, along with common order data and corresponding preference data. The order data and preference data may be supplied by the subscriber, or may be supplied by an Internet Protocol Multimedia Subsystem (IMS) and may be generated by the IMS in response to subscriber input. Moving to block 520, a subscription status of the subscriber to a contact service is verified to be active. Proceeding to block 530, data is entered into an ENUM server, each data record entry including the URI, the common order data and the corresponding preference data. Moving to block 540, the data record entries associated with the subscriber are stored in the ENUM server in a subscriber record associated with the subscriber. The method terminates at 550. (In another particular illustrative embodiment in which each URI has a common preference value and a unique order value, each data record entry will include a URI, its corresponding order value, and the common preference value. In another particular illustrative embodiment, each URI may have a unique associated order data value and unique associated preference data value, and each data record will include one of the URIs, its corresponding order value and its corresponding preference value.)

Figure 6:
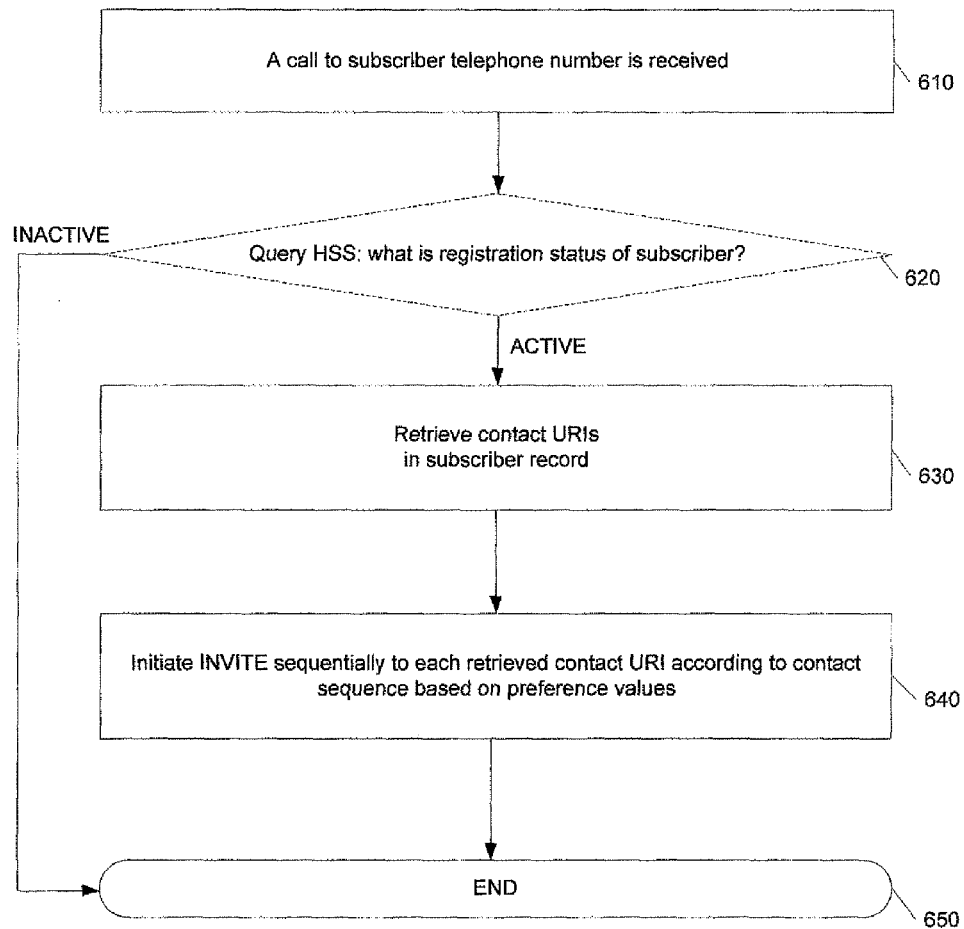
FIG. 6 is a flow chart of a first particular illustrative embodiment of a method to provide contact services in a communication network.

FIG. 6 is a flow chart of a first particular illustrative embodiment of a method to provide contact services in a communication network. Each subscriber record of a Telephone Number Mapping (ENUM) server includes a plurality of data record entries where each data record entry includes a Uniform Resource Identifier (URI), a common order data value and a unique preference data value. At block 610, a call to a subscriber telephone number associated with a subscriber is received. In a particular embodiment, the call is received by an Internet Protocol Multimedia Subsystem (IMS). Moving to optional decision block 620, a Home Subscriber System (HSS) in the IMS is queried to determine if a registration status of the subscriber for a contact service is active. If the registration status is inactive, the method ends at 650. If the registration status of the subscriber is active, the method proceeds to block 630. (If the optional decision block 620 is not included, the method proceeds from block 610 to block 630). At block 630, the URIs are retrieved from the subscriber record in an ENUM server. Proceeding to block 640, the method initiates an INVITE message, in a sequential order, to destination devices identified by the URIs retrieved, according to a contact sequence that is based on the corresponding preference data values of the retrieved URIs. The method terminates at 650. (In another particular illustrative embodiment not shown, in which each URI has a common preference value and a unique order value, the contact sequence may be based at least in part on the corresponding order data values of the retrieved URIs. In another particular illustrative embodiment, not shown, in which each URI has a corresponding preference data value differing from the other URIs and a corresponding order data value differing from the other URIs, the contact sequence may be based at least in part on the corresponding order data value and preference data values.)

Figure 7:
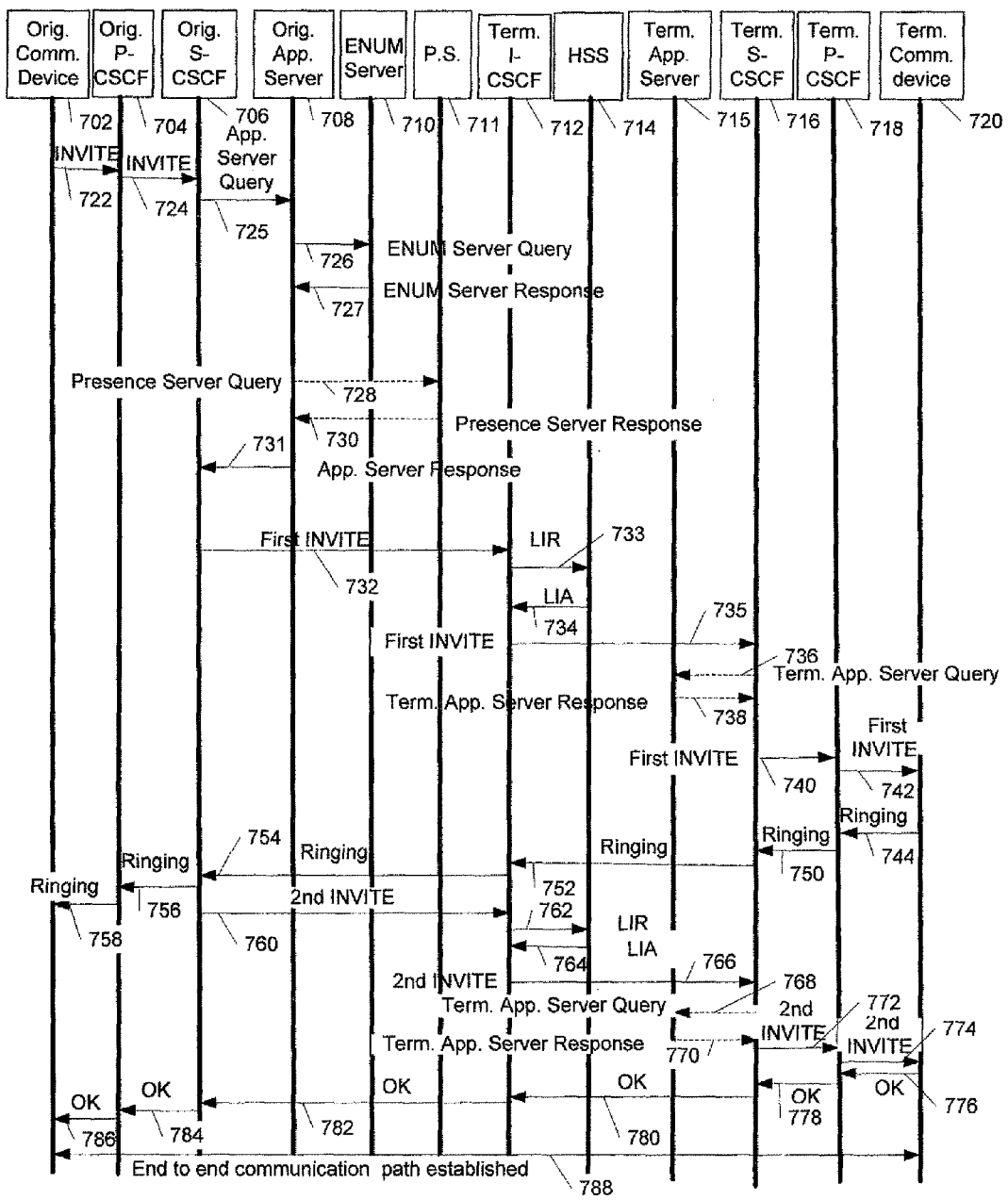
FIG. 7 is a ladder chart of a particular illustrative embodiment of a method to provide contact services in a communication network.

FIG. 7 is a ladder chart of a particular illustrative embodiment of a method to provide contact services in a communication network. An Originating Communication Device 702 calling a subscriber telephone number initiates an INVITE message 722 to an Originating Proxy-Call Session Control Function (P-CSCF) 704 of an Internet Protocol Multimedia Subsystem (IMS). The Originating P-CSCF 704 sends an INVITE message 724 to an Originating Serving-Call Session Control Function (S-CSCF) 706. The Originating S-CSCF 706 sends an Application Server Query 725 to an Originating Application Server 708. The Originating Application Server 708 sends a Telephone Number Mapping (ENUM) Server Query 726 to an ENUM Server 710. The ENUM Server 710 returns an ENUM Server Response 727 that includes data record entries stored in a subscriber record associated with the subscriber telephone number. The Originating Application Server 708 determines that each data record entry returned has a common order data value and a unique preference data value.

Optionally, in a particular non-limiting illustrative embodiment, the Originating Application Server 708 sends a Presence Server Query 728 to a Presence Server 711, to determine if any destination device identified by a corresponding URI returned in the ENUM Server Response 727 is unavailable to be contacted. The Presence Server 711 sends a Presence Server Response 730 indicating which destination devices are unavailable to be contacted.

The Originating Application Server 708 sends an Originating Application Server Response 731 to the Originating S-CSCF 706 including a contact sequence by which to issue INVITE messages to destination devices identified by the URIs in the subscriber record. (The contact sequence may be modified by the Originating Application Server 708 in response to the Presence Server Response 730, which has been received in response to the Presence Server query 728. For example, the Originating Application Server 708 may eliminate one or more URIs from the contact sequence if those URIs identify devices determined by the Presence Server 711 to be unavailable to be contacted.) In response, the Originating S-CSCF 706 issues a first INVITE message 732 to a Terminating Interrogating-Call Session Control Function (I-CSCF) 712 according to the contact sequence provided by the Originating Application Server 708. The Terminating I-CSCF 712 sends a Location Information Request (LIR) 733 to a Home Subscriber System 714, which returns a Location Information Answer (LIA) 734 to the Terminating I-CSCF 712. The Terminating I-CSCF 712 sends a first INVITE message 735 to a Terminating S-CSCF 716.

In a particular illustrative embodiment, the Terminating S-CSCF 716 may send a Terminating Application Server Query 736 to a Terminating Application Server 715, which may confirm the contact sequence of each of the destination devices identified by the URIs, or may replace the contact sequence by a replacement contacting scheme and send a Terminating Application Server Response 738 to the Terminating S-CSCF 716.

Subsequently, the Terminating S-CSCF 716 may issue a first INVITE message 740 to a Terminating P-CSCF 718 associated with a destination device identified by the first URI of the contact sequence. The Terminating P-CSCF 718 issues a first INVITE message 742 to a corresponding Terminating Communication Device 720 (also destination device herein). The Terminating Communication Device 720 sends a RINGING message 744 to its corresponding Terminating P-CSCF 718, which sends a RINGING message 750 to the Terminating S-CSCF 716. The Terminating S-CSCF 716 sends a RINGING message 752 to the Terminating I-CSCF 712, which sends a RINGING message 754 to the Originating S-CSCF 706. The Originating S-CSCF 706 sends a RINGING message 756 to the Originating P-CSCF 704, which sends a RINGING message 758 to the Originating Communication Device 702.

If the first Terminating Originating Communication Device does not respond to the first INVITE 742 within a time specified period, which is typically specified by the Originating Application Server 708 or by the subscriber, the Originating S-CSCF 706 issues a second INVITE message 760 to the Terminating I-CSCF 712, intended to establish contact with the destination device identified by the second URI of the contact sequence. The Terminating I-CSCF 712 sends a Location Information Request (LIR) 762 to the Home Subscriber System 714, which returns a Location Information Answer (LIA) 764 to the Terminating I-CSCF 712. The Terminating I-CSCF 712 sends a second INVITE message 766 to a Terminating S-CSCF 716.

In a particular illustrative embodiment, the Terminating S-CSCF 716 may send a Terminating Application Server Query 768 to the Terminating Application Server 715, which may confirm the contact sequence of each of the destination devices identified by the URIs, or may replace the contact sequence by a replacement contacting scheme and send a Terminating Application Server Response 770 to the Terminating S-CSCF 716.

Subsequently, the Terminating S-CSCF 716 may issue a second INVITE message 772 to a Terminating P-CSCF 718 associated with the destination device that is identified by the second URI of the contact sequence. The Terminating P-CSCF 718 issues a second INVITE message 774 to the Terminating Communication Device 720 identified by the second URI of the contact sequence.

When contact is established with a particular Terminating Communication Device 720, the particular Terminating Communication Device 720 issues an OK message to the corresponding Terminating P-CSCF 718. In a particular illustrative embodiment, contact has been established with the Terminating Communication Device 720 identified by the second URI of the contact sequence. The Terminating Communication Device 720 contacted sends an OK message 776 to the corresponding Terminating P-CSCF 718, which sends an OK message 778 to the corresponding Terminating S-CSCF 716. The Terminating S-CSCF 716 sends an OK message 780 to the Terminating I-CSCF 712, which sends an OK message 782 to the Originating S-CSCF 706. The Originating S-CSCF 706 sends an OK message 784 to the Originating P-CSCF 704. The Originating S-CSCF 706 also cancels INVITE messages to the other Terminating Communication Devices 720 with which contact has not been established. (In the illustrative example shown, if any other calls are accepted in addition to the second URI of the contact sequence, they are terminated.) The Originating P-CSCF 704 sends an OK message 786 to the Originating Communication Device 702. An end-to-end communication path 772 is set up, via the IMS, between the Originating Communication Device 702 and the Terminating Communication Device 720 with which contact has been established.

Figure 8:
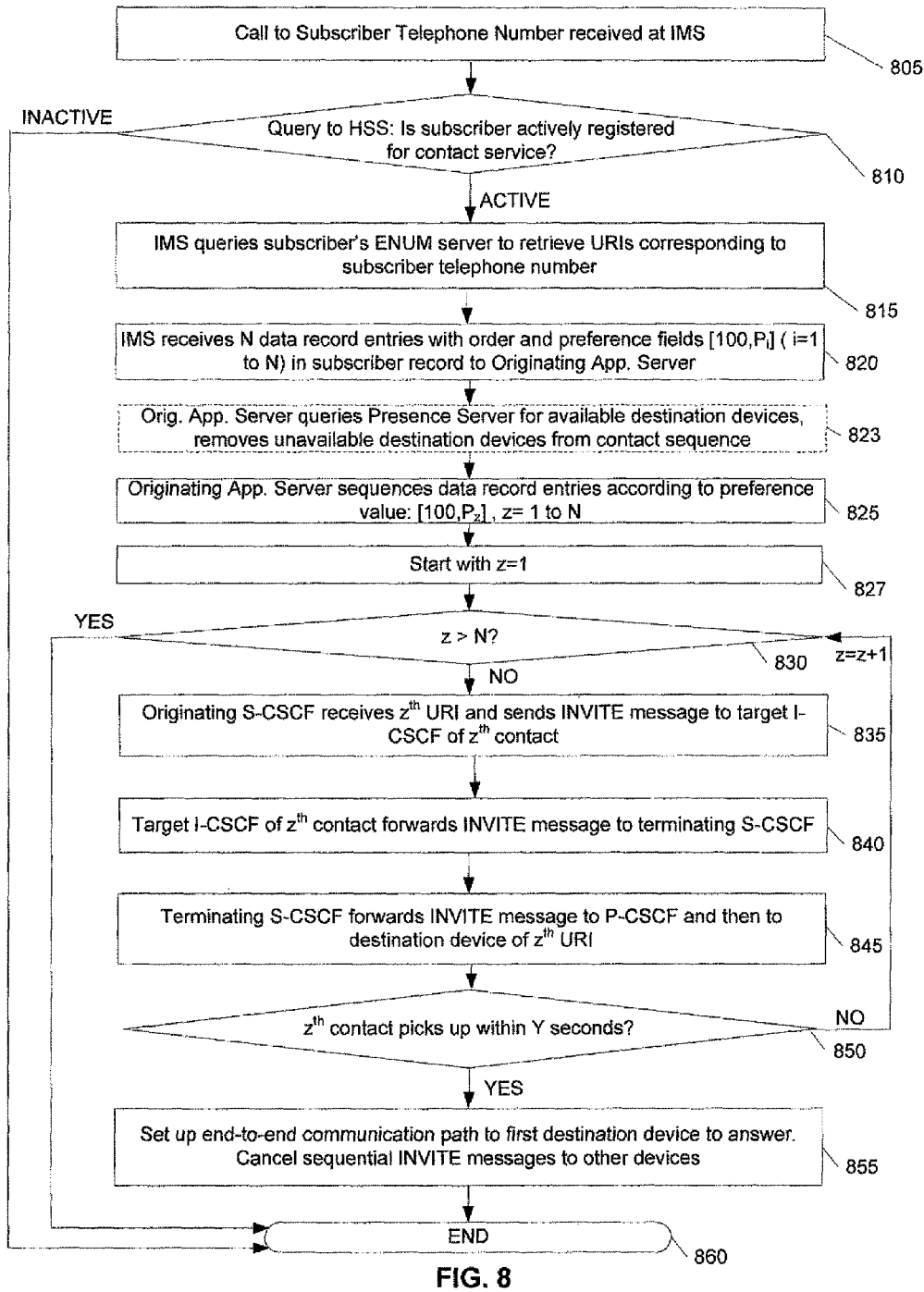
FIG. 8 is a flow chart of a second particular illustrative embodiment of a method to provide contact services in a communication network.

FIG. 8 is a flow chart of a second particular illustrative embodiment of a method to provide contact services in a communication network. At block 805, a call to a Subscriber Telephone Number, such as an E.164 telephone number, is received at an Internet Protocol Multimedia Subsystem (IMS). Proceeding to decision block 810, a query is placed to a Home Subscriber Server (HSS) to determine if the subscriber is actively registered for a multiple calling contact service. If the subscriber is not actively registered for the multiple calling contact service, the method terminates at 860. If the subscriber is actively registered, the method proceeds to block 815. At block 815, the IMS sends a request to a Telephone Number Mapping (ENUM) server to retrieve URIs corresponding to the called Subscriber Telephone Number. Moving to block 820, the IMS receives data record entries including URIs and corresponding order data and preference data that are stored in a subscriber record corresponding to the called subscriber telephone number. A total of N data record entries are supplied, each having a common order data value and each having a different preference data value $P_i$ (i=1 to N).

Optionally, at block 823, the Originating Application Server queries a Presence Server to determine if any of the URIs supplied by the ENUM server identify destination devices that are unavailable to be contacted, and the Originating Application Server can remove URIs that identify unavailable destination devices from a contact sequence to be provided by the Originating Application Server.

Continuing to block 825, the Originating Application Server sequences the N records according to preference data value, forming the contact sequence of data record entries with URIs and corresponding fields [100, $P_z$] (z=1 to N) (using an index z, where z corresponds to a position in the sequence), in which a smaller value of z corresponds to a more preferential contact The contact sequence may be determined based on corresponding preference data values $P_z$. In a particular non-limiting illustrative embodiment, a smaller value of $P_z$ corresponds to a more preferential position in the contact sequence. (In another particular illustrative example in which URIs have common preference data values and unique order data values, the Originating Application Server sequences the N records according to order data value. For example, the contact sequence of data record entries may have corresponding fields [$O_z$, 10] where each URI has an associated order data value $O_z$ and an associated preference data value of 10.)

At block 827, the method considers the record corresponding to z=1, which corresponds to a more preferential contact of the N data record entries supplied. Proceeding to decision block 830, the method asks if z is greater than the total number N of data record entries and corresponding URIs, to ensure that each URI has been considered. If z is greater than N, then all URIs have been considered and the method ends at 860. If z is not greater than N, the method proceeds to block 835. At block 835, the Originating S-CSCF sends an INVITE message to a target I-CSCF of the $z^{th}$ URI in the contact sequence. Moving to block 840, the target I-CSCF of the $z^{th}$ URI forwards the INVITE message to a Terminating S-CSCF. Proceeding to 845, the Terminating S-CSCF forwards the INVITE message to a Terminating P-CSCF, and then to the $z^{th}$ destination device, which is the destination device associated with the $z^{th}$ URI. Moving to decision block 850, the Originating S-CSCF determines if the $z^{th}$ destination device has established contact within Y seconds. In an illustrative example, Y can be set equal to a constant. In another illustrative example, Y may be set to a constant multiplied by a difference between successive preference data values. In yet another illustrative example, Y may be functionally related to one or more of the preference data values $P_z$. (In another particular illustrative example in which URIs have common preference data values and unique order data values, Y may be set to a constant multiplied by a difference between successive order data values. In yet another illustrative example, Y may be functionally related to one or more of the order data values $O_z$.)

If the $z^{th}$ device establishes contact, by e.g., answering, within Y seconds of ringing, the method proceeds to block 855. At block 855 an end-to-end communication path between the contacted destination device and an originating device is set up, and attempts to contact all other destination devices are stopped, such as by canceling INVITE messages to the other destination devices. In an illustrative embodiment, the IMS establishes the end-to-end communication path between the originating device and the first destination device to answer, and also stops issuing INVITE messages to the other destination devices identified by URIs in the contact sequence, and cancels any other calls that may have been accepted.

If the $z^{th}$ device does not establish contact within Y seconds, then the method adds one to the value of z. The method returns to block 830 and the method proceeds sequentially through blocks 835 to 850 for each of the URIs until one of the devices establishes contact, or until all N devices have been tried. When one of the devices has established contact, attempts to contact all other sequential URIs cease, which may be effected by canceling all remaining INVITE messages that have not been sent and cancelling any other calls that may have been accepted. The method ends at block 860.

Destination devices may include VoIP devices, cellular telephones via a wireless network, home telephone via e.g., VoIP, PSTN, or another network, Personal Digital Assistants via an IP network, computers via an IP network, or other destination devices. A communication provided to the destination device after contact is established may be a pre-recorded message, an instant message (IM), electronic mail (email), a page via a pager, a live call, or via another communication mode.

Figure 9:
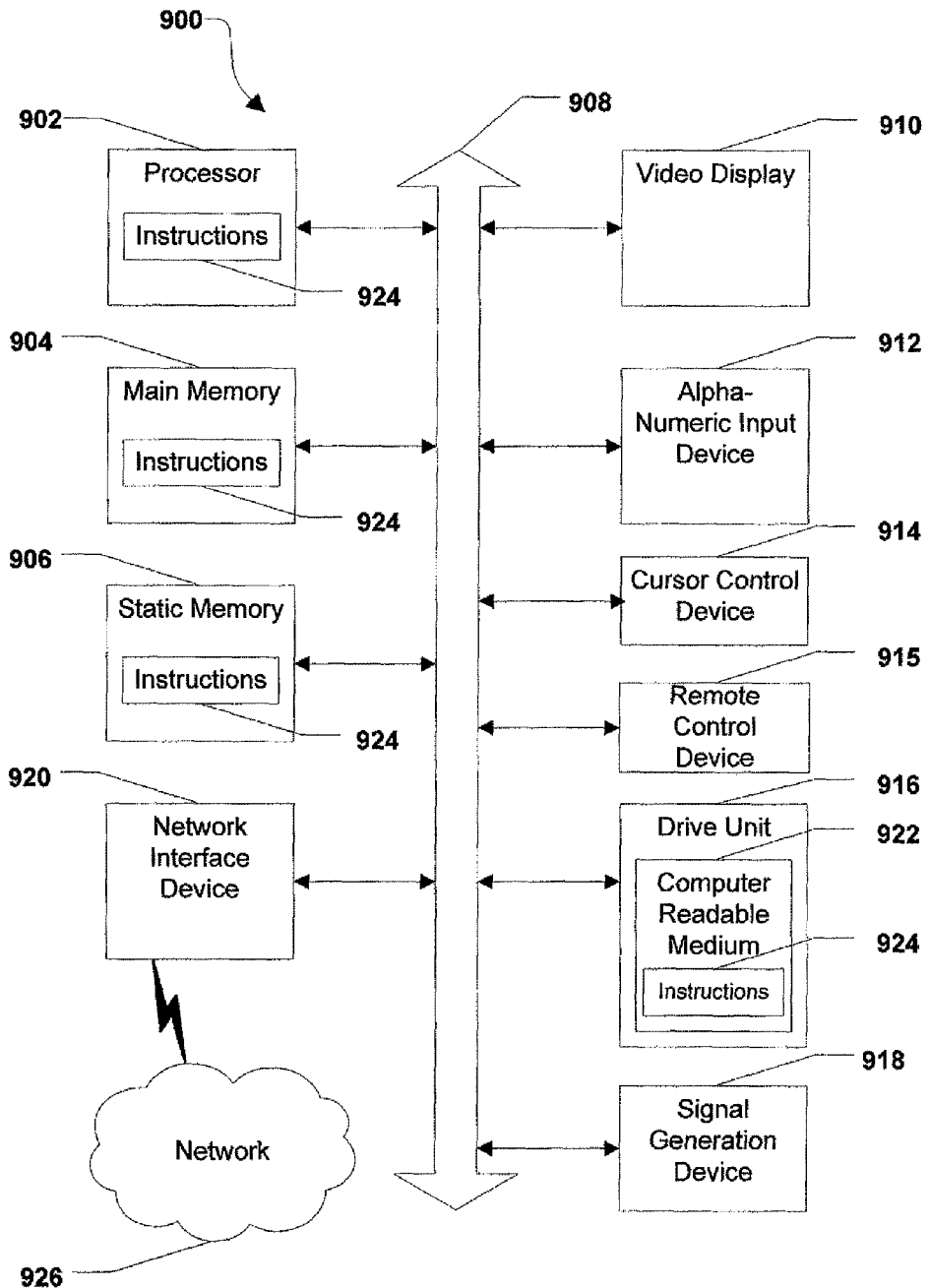
FIG. 9 is a general diagram of a particular illustrative embodiment of a computer system.

FIG. 9 is a general diagram of a particular illustrative embodiment of a computer system 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems, or peripheral devices, including an ENUM server, components of an IMS, or originating and destination devices, as shown in FIGS. 1-4.

In a networked deployment, the computer system may operate in the capacity of a content source, network management system, a server, set-top box device, or network switch. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, which can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, a cursor control device 914, such as a mouse, and a remote control device 915. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium A transitory signal is not included herein as an example of a computer-readable medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A communication system comprising:
an application server including logic to receive corresponding preference data for each of a plurality of data record entries of a subscriber record from a telephone number mapping server and to determine a contact sequence including a plurality of uniform resource indicators, wherein each uniform resource indicator corresponds to one of the plurality of data record entries and each uniform resource indicator is associated with a corresponding destination device,
wherein the contact sequence includes a temporal schedule that specifies a first time period between initiating a first invite message to a first uniform resource indicator and initiating a second invite message to a second uniform resource indicator, wherein the first time period is determined based on a difference between first preference data of a first data record entry associated with the first uniform resource indicator and second preference data of a second data record entry associated with the second uniform resource indicator, and wherein the second invite message is initiated conditioned on passage of the first time period following initiation of the first invite message, and
wherein the contact sequence indicates a corresponding time period between initiation of an invite message to a particular uniform resource indicator in the contact sequence and an invite message to a next uniform resource indicator in the contact sequence, wherein a particular time period is determined based on a difference between the preference data of the data record entry associated with the particular uniform resource indicator and the preference data of the data record entry associated with the next uniform resource indicator, and wherein the invite message to the next uniform resource indicator is initiated conditioned on passage of the particular time period following initiation of the invite message to the particular uniform resource indicator.

2. The communication system of claim 1, wherein each data record entry includes one of the plurality of uniform resource indicators, order data, and corresponding preference data, wherein the order data of each data record entry is identical and the preference data of each data record entry is unique.

3. The communication system of claim 1, further comprising a serving call session control function within an internet protocol multimedia subsystem, the serving call session control function configured to:
receive the plurality of uniform resource indicators from a server; and initiate invite messages to a destination device identified by a corresponding uniform resource indicator, wherein the invite messages are initiated in a sequential order according to the contact sequence, and wherein each initiated invite message results in a connection attempt to the corresponding destination device.

4. The communication system of claim 1, further comprising a serving call session control function within an internet protocol multimedia subsystem, the serving call session control function configured to:
receive the plurality of uniform resource indicators from a server; and initiate invite messages to a destination device identified by a corresponding uniform resource indicator, wherein the invite messages are initiated in a sequential order according to the contact sequence, and wherein each initiated invite message results in a connection attempt to the corresponding destination device.

5. The communication system of claim 1, wherein the application server further includes logic to receive order data for each of the plurality of data record entries, and wherein when the preference data of each data record entry is identical, the contact sequence is based at least in part on the received order data.

6. The communication system of claim 1, further including a presence server, wherein the presence server is operable to:
determine a device availability, the device availability comprising an indication of each destination device that is unavailable to be contacted; and
provide the device availability to the application server.

7. The communication system of claim 1, wherein the temporal schedule specifies a second time period, wherein a third invite message is initiated conditioned on passage of the second time period following initiation of the second invite message, and wherein the second time period is determined based on a difference in corresponding preference values of corresponding data record entries associated with the second uniform resource indicators and a third uniform resource indicators of the plurality of uniform resource indicators.

8. The communication system of claim 7, wherein the second time period differs from the first time period.

9. The method communication system of claim 1, wherein a corresponding time period between sending a corresponding invite message to each of any pair of successive uniform resource indicators of the contact sequence is proportional to the corresponding difference in preference values of corresponding data record entries associated with each pair of successive uniform resource indicators.

10. A method comprising:
receiving, from a telephone number mapping server, a plurality of uniform resource indicators, wherein each of the plurality of uniform resource indicators has a common order value and each of the plurality of uniform resource indicators has a distinct preference value; and
sequentially initiating invite messages via an internet protocol multimedia subsystem to destination devices identified by each of the plurality of uniform resource indicators according to a sequence order,
wherein the sequence order specifies a first period of time between initiating a first invite message and a second invite message that is issued after the first invite message and the sequence order specifies a second period of time between initiating the second invite message and a third invite message that is initiated after the second invite message , wherein the third invite message is initiated conditioned on passage of the second period of time following the initiation of the second invite message, and wherein the first period of time and the second period of time are approximately equal, and
wherein the first period of time is determined based on a difference in corresponding preference values of a first uniform resource indicator of the plurality of uniform resource indicators and a second uniform resource indicator of the plurality of uniform resource indicators, and wherein initiation of the second invite message is conditioned on passage of the first period of time following the initiation of the first invite message.

11. The method of claim 10, wherein the sequence order is based at least in part on the corresponding preference values of the plurality of uniform resource indicators.

12. The method of claim 10, wherein the plurality of uniform resource indicators are received in response to receipt of a call to a subscriber telephone number.

13. The method of claim 10, further comprising:
stopping initiation of additional invite messages when contact has been established with a particular destination device; and
establishing an end-to-end communication path between an originating party and the particular destination device.

14. The method of claim 10, wherein a corresponding time period between initiating a respective invite message to each uniform resource indicator of any pair of successive uniform resource indicators of the contact sequence is proportional to a difference in the corresponding preference values of the pair of successive uniform resource indicators.

15. A method of registering a plurality of devices with a telephone number mapping server, the method comprising:
receiving a plurality of uniform resource indicators, each uniform resource indicator identifying one of a plurality of devices to be registered;
assigning to each uniform resource indicator a common order value;
assigning to each uniform resource indicator a unique preference value;
establishing a contact sequence of the plurality of uniform resource indicators that identifies an order in which to contact each of the plurality of devices identified by the plurality of uniform resource indicators, wherein the order is determined based on the corresponding preference values of each of the plurality of uniform resource indicators;
forming a data record entry for each uniform resource indicator, wherein each data record entry includes the order value and the corresponding preference value;
storing the data record entries in the telephone number mapping server;
retrieving the data record entries; and
attempting to contact each of the plurality of devices via an internet protocol multimedia subsystem sequentially according to the order of the contact sequence,
wherein the contact sequence includes a temporal schedule that specifies a time period associated with a pair of successive uniform resource indicators in the contact sequence, the time period determined based on a difference in corresponding preference values of the pair of successive uniform resource indicators, and wherein an invite message is initiated to a second uniform resource indicator of the pair of successive uniform resource indicators conditioned on passage of the time period following initiation of another invite message to a first uniform resource indicator of the pair of successive uniform resource indicators.

16. The method of claim 15, wherein the contact sequence is selectable based on subscriber input.

17. The method of claim 15, wherein the order value and the preference values are assigned by an application server.

18. The method of claim 17, wherein the application server is part of the internet protocol multimedia subsystem.

19. The method of claim 15, further comprising verifying that a registration status of a subscriber account associated with a subscriber is active before receiving the plurality of uniform resource indicators.

20. The method of claim 15, further comprising:
associating each data record entry with a subscriber telephone number; and
retrieving each data record entry after an originating party has placed a call to the subscriber telephone number.

21. The method of claim 15, wherein each difference in corresponding preference values of successive URIs of the contact sequence is a same preference value difference and the contact sequence specifies a same time period between initiating each invite message and an immediately succeeding invite message.

22. A non-transitory computer-readable medium including computer executable instructions to cause a processor to:
receive a contact request via a subscriber telephone number associated with a subscriber;
initiate invite messages sequentially via an interne protocol multimedia subsystem to each of a plurality of devices associated with the subscriber in response to the contact request, wherein the invite messages are initiated according to an ordered sequence;
initiate the invite messages sequentially according to a temporal schedule that is based on corresponding preference values of a plurality of uniform resource indicators of the ordered sequence, wherein the temporal schedule specifies a corresponding period of time associated with each pair of successive uniform resource indicators of the ordered sequence, wherein a particular invite message to a particular uniform resource indicator is initiated conditioned on passage of a particular period of time following initiation of another invite message to the uniform resource indicator immediately preceding the particular uniform resource indicator, wherein the particular period of time is associated with a particular pair of successive uniform resource indicators including the particular uniform resource indicator and the uniform resource indicator immediately preceding the particular uniform resource indicator,
wherein each of the plurality of devices is identified by a corresponding uniform resource indicator stored in a telephone number mapping server,
wherein a unique preference value is associated with each uniform resource indicator, and wherein the ordered sequence is determined based on the corresponding preference values of the plurality of uniform resource indicators, and
wherein the ordered sequence specifies a first period of time between initiating a first invite message to a first device identified by a first uniform resource indicator and a second invite message to a second device identified by a second uniform resource indicator, wherein the first period of time is determined based on a difference in corresponding preference values of the first uniform resource indicator and the second uniform resource indicator, and wherein the second invite message is initiated conditioned on passage of the first period of time following initiation of the first invite message.

* * * * *